US011988550B1

(12) United States Patent
Choi et al.

(10) Patent No.: US 11,988,550 B1
(45) Date of Patent: May 21, 2024

(54) APPARATUS FOR DETECTING CONTAMINATION ON GLASS DOME OF SOLAR RADIATION OBSERVING SENSOR

(71) Applicant: National Institute of Meteorological Sciences, Seogwipo-si (KR)

(72) Inventors: Kyu Young Reno Choi, Seogwipo-si (KR); Ki Hoon Kim, Seogwipo-si (KR); So Ra In, Seogwipo-si (KR); Min Woo Kim, Seogwipo-si (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 0 days.

(21) Appl. No.: 18/384,787

(22) Filed: Oct. 27, 2023

(30) Foreign Application Priority Data

Oct. 31, 2022 (KR) .......................... 10-2022-0142952

(51) Int. Cl.
*G01J 1/42* (2006.01)
*G01J 1/04* (2006.01)

(52) U.S. Cl.
CPC ............... *G01J 1/42* (2013.01); *G01J 1/0411* (2013.01); *G01J 2001/4266* (2013.01)

(58) Field of Classification Search
CPC ...... G01J 2001/428; G01J 1/04; G01J 1/0403; G01J 1/0407; G01J 1/0411; G01J 1/4228; G01J 2001/4266; G01J 1/4204; G01J 1/42
See application file for complete search history.

(56) References Cited

U.S. PATENT DOCUMENTS 10,024,577 B2 * 7/2018 Becker ................... C03B 19/09
2011/0273704 A1 * 11/2011 Burba ................... G01J 1/4228
250/237 R
2014/0360491 A1 * 12/2014 Becker ................... F24S 20/20
65/17.4
2019/0145907 A1 5/2019 Van Mechelen et al.
2022/0357646 A1 * 11/2022 Kurtz ................... H04N 23/51

FOREIGN PATENT DOCUMENTS

EP 4019917 A1 6/2022
JP 2013-511431 A 4/2013
JP 2016-045161 A 4/2016

OTHER PUBLICATIONS

Decision to Grant issued in Korean Patent Application No. 10-2022-0142952, May 9, 2023, 9 pp. w/ translation.
Office Action issued in Korean Patent Application No. 10-2022-0142952, Mar. 24, 2023, 10 pp. w/ translation.

* cited by examiner

*Primary Examiner* — John R Lee

(74) *Attorney, Agent, or Firm* — Kaplan Breyer Schwarz, LLP

(57) ABSTRACT

There is provided an apparatus for detecting the contamination on the glass dome of the solar radiation observing sensor. The apparatus includes: the solar radiation observing sensor; the glass dome; a light source, wherein artificial light emitted from the light source is allowed to be incident on the medium of the glass dome at a predetermined angle and thus the artificial light incident on the medium of the glass dome is allowed to undergo total internal reflection; a light-collecting lens configured to collect natural light and a diffusedly-reflected part of the artificial light; and a contamination-detecting sensor configured to detect contamination, wherein the contamination-detecting sensor measures the natural light and the diffusedly-reflected part of the artificial light collected by the light-collecting lens.

6 Claims, 5 Drawing Sheets

APPARATUS FOR DETECTING CONTAMINATION ON GLASS DOME OF SOLAR RADIATION OBSERVING SENSOR

CROSS REFERENCE OF RELATED APPLICATION

This present application claims the benefit of the earlier filing date of Korean patent application No. 10-2022-0142952, filed on Oct. 31, 2022, the entire contents of which being incorporated herein by reference.

FIELD OF THE DISCLOSURE

The present disclosure relates to an apparatus for detecting contamination on a glass dome of a solar radiation observing sensor.

BACKGROUND OF THE DISCLOSURE

A solar radiation observing sensor is equipment for measuring the intensity of the sunlight. For such a solar radiation observing sensor, a glass dome is used in order to prevent damage and contamination of the sensor. However, various contaminations may occur on such a glass dome, and such contaminations may affect the quality of observation of the solar radiation observing sensor.

As examples of main causes of the contaminations of the glass dome, there are internal condensation due to the difference in temperature between inside and outside of the glass dome and dust sticking, etc. outside the glass dome due to yellow dust and fog, etc.

In order to resolve the contamination of the glass dome, cleaning can be done periodically, but contaminations unexpectedly occurring between scheduled maintenances may affect the quality of observation of the solar radiation observing sensor.

In addition, as conventional examples for solving the problem of the internal condensation due to the difference in temperature between inside and outside of the glass dome, a drying agent such as silica gel was put inside a pyranometer, or an inner drying device was mounted, or a method of preventing the internal condensation by making the inside be a vacuum state was also used. Referring to FIG. 4A, a structure of the pyranometer where the conventional internal drying device is mounted is shown. In detail, the inside may be dried by putting drying materials such as silica gel and calcium chloride into a desiccator while affecting the quality of observation as little as possible.

In addition, as an example for solving the problem of the dust sticking outside, a method for minimizing the dust accumulated on the glass dome by using a ventilator capable of blowing wind to an outer circumference of the glass dome. Referring to FIG. 4B, an example of a pyranometer in which the conventional ventilator is installed is shown. In detail, the dust sticking may be prevented to some degree by blowing wind, but the dust tightly stuck to the glass dome by rain or snow was difficult to remove with just the ventilator.

Therefore, a technology for accurately monitoring a degree of the contamination in real time and responding to the contamination is required.

SUMMARY OF THE DISCLOSURE

It is an object of the present disclosure to solve all the aforementioned problems.

It is another object of the present disclosure to provide an apparatus for detecting contamination capable of recognizing a position and a degree of the contamination occurred on a glass dome of a solar radiation observing sensor in real time by collecting diffusely-reflected light due to the contamination.

It is still another object of the present disclosure to provide the apparatus for detecting the contamination capable of accurately recognizing the position and the degree of the contamination occurred on the glass dome of the solar radiation observing sensor by comparing an amount of sensed light acquired through the glass dome in a contaminated state and an amount of sensed light acquired through the glass dome in a clean state.

It is still yet another object of the present disclosure to provide the apparatus for detecting the contamination capable of accurately recognizing the position and the degree of the contamination regardless of an installed position of a light-collecting lens for detecting the contamination occurred on the glass dome of the solar radiation observing sensor.

It is still yet another object of the present disclosure to provide an apparatus for detecting the contamination capable of performing calibration by measuring an effect on a measured value of the solar radiation observing sensor due to the contamination occurred on the glass dome of the solar radiation observing sensor.

In accordance with one aspect of the present disclosure, there is provided an apparatus for detecting contamination on a glass dome of a solar radiation observing sensor, comprising: a solar radiation observing sensor; a glass dome, installed in a first region of a support plate, made of a medium having a predetermined thickness surrounding the solar radiation observing sensor; a light source, wherein artificial light emitted from the light source is allowed to be incident on the medium of the glass dome at a predetermined angle and thus the artificial light incident on the medium of the glass dome is allowed to undergo total internal reflection within the medium of the glass dome, a light-collecting lens configured to collect (i) natural light transmitted from a first outside region of the glass dome to a second outside region of the glass dome and (ii) a part of the artificial light diffusedly reflected to the second outside region by a contaminated region on the surface of the glass dome, wherein an upper outside of the glass dome is referred to as the first outside region and a lower outside of the glass dome is referred to as the second outside region and wherein the light-collecting lens is installed in a second region of the support plate and an outer perimeter of the second region is closer to a center of the support plate than an outer perimeter of the first region; and a contamination-detecting sensor configured to detect contamination, wherein the contamination-detecting sensor measures the natural light and the artificial light collected by the light-collecting lens.

As one example, there is provided the apparatus further comprising: a beam splitter configured to deliver a part of the natural light and the artificial light collected by the light-collecting lens to the contamination-detecting sensor and deliver a remaining part of the natural light and the artificial light collected by the light-collecting lens to the solar radiation observing sensor.

As one example, there is provided the light-collecting lens is positioned at a top of the beam splitter, and a light path passing through the beam splitter is matched with a predetermined spot of the solar radiation observing sensor.

As one example, there is provided the apparatus further comprising: a processor configured to (i) acquire a first measurement which is a value measured at a first night time when no contamination is present on the surface of the glass dome immediately after the solar radiation observing sensor and the glass dome are installed or cleaned and a second measurement which is a value measured at a second night time which follows the first night time and (ii) determine a degree of contamination and the contaminated region by referring to a comparison result between the first measurement and the second measurement.

As one example, there is provided the apparatus further comprising: a band-pass filter configured to allow light that matches with a main wavelength range of the light source or light whose wavelength range is within a preset threshold from the main wavelength range.

As one example, there is provided the apparatus that in case first natural light is introduced from the first outside region to the second outside region through a first spot of the glass dome and in case second natural light is introduced from the first outside region to the second outside region through a second spot of the glass dome, a first focal distance between the first spot and a focal point of the light-collecting lens is determined as being identical to a second focal distance between the second spot and the focal point of the light-collecting lens.

As one example, there is provided the apparatus that the light-collecting lens is a fisheye lens.

As one example, there is provided the apparatus that the light-collecting lens is positioned between a specific point included in the first region and a central region of the support plate.

As one example, there is provided the apparatus that, on condition that each of multiple pieces of distribution information of the natural light and the artificial light is stored and managed for each of distances between the light-collecting lens and the specific point and for each of incident angles on the light-collecting lens, a position of the contamination on the glass dome is specified by referring to a specific installed position of the light-collecting lens and a specific distribution of the natural light and the artificial light collected by the light-collecting lens.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
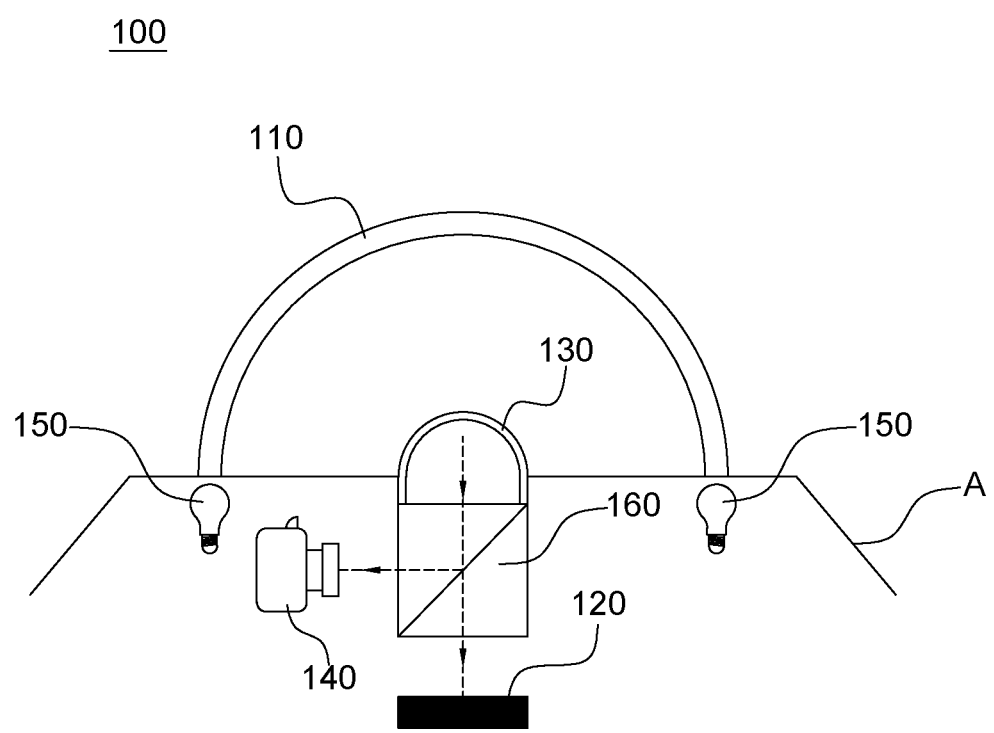
FIG. 1 is a drawing schematically illustrating a configuration of an apparatus for detecting contamination on a glass dome of a solar radiation observing sensor in accordance with one example embodiment of the present disclosure.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

FIG. 1 is a drawing schematically illustrating a configuration of an apparatus 100 for detecting contamination on a glass dome of a solar radiation observing sensor in accordance with one example embodiment of the present disclosure.

Referring to FIG. 1, the apparatus 100 for detecting the contamination on the glass dome of the solar radiation observing sensor includes a glass dome 110, a solar radiation observing sensor 120, a light-collecting lens 130, a contamination-detecting sensor 140 and at least one light source 150. The apparatus 100 for detecting the contamination on the glass dome of the solar radiation observing sensor may further include a beam splitter 160.

The glass dome 110 is installed on a first region of a support plate A while surrounding and protecting the solar radiation observing sensor 120. The glass dome 110 is made of a medium having a predetermined thickness. The medium is generally glass, but it is not essentially limited thereto.

The light source(s) 150 is configured to allow artificial light emitted therefrom to be incident on the medium of the glass dome 110 at a predetermined angle and thus the artificial light incident on the medium of the glass dome is allowed to undergo total internal reflection within the medium of the glass dome 110. If there is no contamination on the glass dome 110, theoretically the light source 150 will continuously allow the artificial light to undergo the total internal reflection inside the glass dome 110, and accordingly there will be no component of the light source 150 detected by the light-collecting lens 130. For reference, the light source 150 may emit the artificial light with a specific wavelength range that is optimized to a spectrum characteristic of water or dust that takes account for the most cases of the contamination, and accordingly an accuracy of detecting the contaminating may be improved, but it is not limited thereto.

The light-collecting lens 130 is configured to collect (i) natural light transmitted from a first outside region of the glass dome 110 to a second outside region of the glass dome 110 and (ii) a part of the artificial light from the light source 150 diffusedly reflected to the second outside region by a contaminated region on the surface of the glass dome 110, wherein an upper outside of the glass dome is referred to as the first outside region and a lower outside of the glass dome is referred to as the second outside region. Herein, the light-collecting lens 130 is installed on a second region of the support plate A and an outer perimeter of the second region is closer to a center of the support plate A than an outer perimeter of the first region. However, FIG. 1 shows that the light-collecting lens 130 is installed at the center of the support plate A. The light-collecting lens 130 may be a fisheye lens, but it is not essentially limited thereto.

In addition, in case first natural light is introduced from the first outside region to the second outside region through a first spot of the glass dome 110 and in case second natural light is introduced from the first outside region to the second outside region through a second spot of the glass dome 110, a first focal distance between the first spot and a focal point of the light-collecting lens 130 is determined as being identical to a second focal distance between the second spot and the focal point of the light-collecting lens 130. That is, whichever spot of the glass dome 110 the natural light is introduced through, in order to have the identical focal distance, the glass dome 110 may be configured in a form of a hemisphere in accordance with one example embodiment of the present disclosure.

The beam splitter 160 is configured to deliver a part of the natural light and the artificial light collected by the light-collecting lens 130 to the contamination-detecting sensor 140 and deliver a remaining part of the natural light and the artificial light collected by the light-collecting lens 130 to the solar radiation observing sensor 120. Considering the light is divided and delivered from the beam splitter 160, a real intensity of radiation may be calculated by multiplying a predetermined number to an intensity of radiation observed at the solar radiation observing sensor 120.

Herein, the light-collecting lens 130 is positioned at a top of the beam splitter 160, and a light path passing through the beam splitter 160 is matched with a predetermined spot of the solar radiation observing sensor 120. That is, the light collected through the light-collecting lens 130 is delivered to the solar radiation observing sensor 120 along the light path via the beam splitter 160.

The contamination-detecting sensor 140 receives and measures a part of the natural light and the artificial light collected by the light-collecting lens 130 and divided by the beam splitter 160. The method for specifying the contamination shall be specifically explained in FIG. 2.

In case the contamination-detecting sensor 140 is a camera, the contamination-detecting sensor 140 can play a role of a cloud camera while the light source 150 is not in use. Performing the role of the cloud camera, the contamination-detecting sensor 140 can measure the influence of a surrounding obstructing structure such as a building, and can reduce the influence of the surrounding obstructing structure by calibration.

Figure 2:
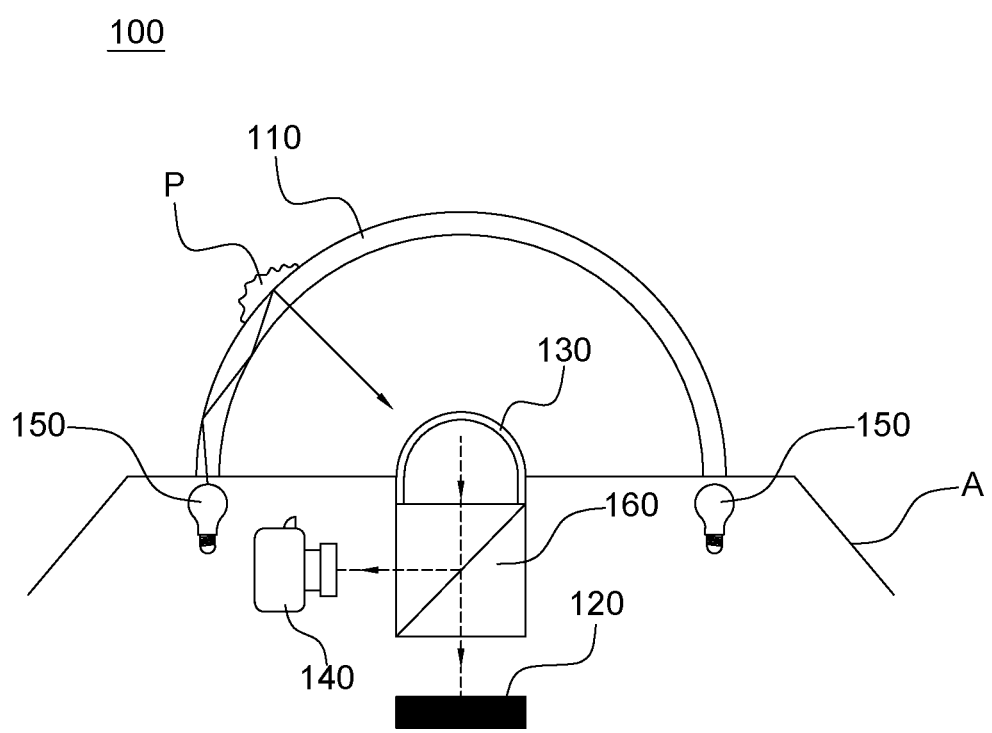
FIG. 2 is a drawing schematically illustrating a structure of the apparatus for detecting the contamination on the glass dome of the solar radiation observing sensor in accordance with one example embodiment of the present disclosure.

FIG. 2 is a drawing schematically illustrating a structure of the apparatus for detecting the contamination on the glass dome of the solar radiation observing sensor in accordance with one example embodiment of the present disclosure.

Referring to FIG. 2, the artificial light emitted from the light source 150 is initially totally internally reflected in the medium of the glass dome 110 and then some of the artificial light is diffusely reflected by a contamination P. The diffusely-reflected light is collected by the light-collecting lens 130 and then some of it is delivered to the contamination-detecting sensor 140 by the beam splitter 160. The contamination-detecting sensor 140 may include a band-pass filter (not shown) configured to allow light that matches with a main wavelength range of the light source 150 or light whose wavelength range is within a preset threshold from the main wavelength range.

In addition, the apparatus 100 for detecting the contamination on the glass dome of the solar radiation observing sensor may include a processor configured to (i) acquire a first measurement which is a value measured at a first night time when no contamination is present on the surface of the glass dome 110 immediately after the solar radiation observing sensor 120 and the glass dome 110 are installed or cleaned and a second measurement which is a value measured at a second night time which follows the first night time and (ii) determine a degree of the contamination and a region of the contaminated by referring to a comparison result between the first measurement and the second measurement. The first measurement may be considered as an "initial value," and the second measurement may be considered as a measurement of a contaminated state. That is, the measurement of the contaminated state can be compared to the initial value to determine the degree and the position of the contamination. The reason for proceeding the measurement of degree of the contamination at night is because in the day when the intensity of radiation introduced is much there are considerable elements affecting the measurement such as the scattered light and the reflected light, but at night only the effect of moonlight and starlight should be considered, and thus the measurement of the degree of the contamination at night is preferred.

In addition, a calibrating formula for calibrating observed values of the solar radiation observing sensor 120 can be derived by analyzing each pieces of the amount of light for each of positions of the contamination and/or for each of degrees of the contamination.

Figure 3:
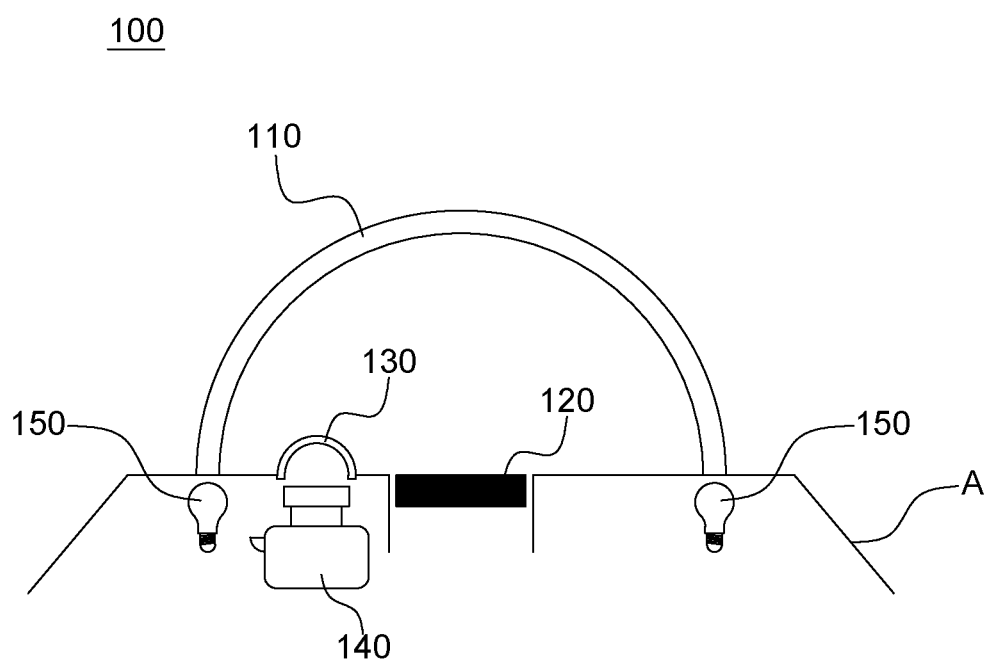
FIG. 3 is a drawing schematically illustrating a configuration of the apparatus for detecting the contamination on the glass dome of the solar radiation observing sensor in accordance with another example embodiment of the present disclosure.
Figure 4A:
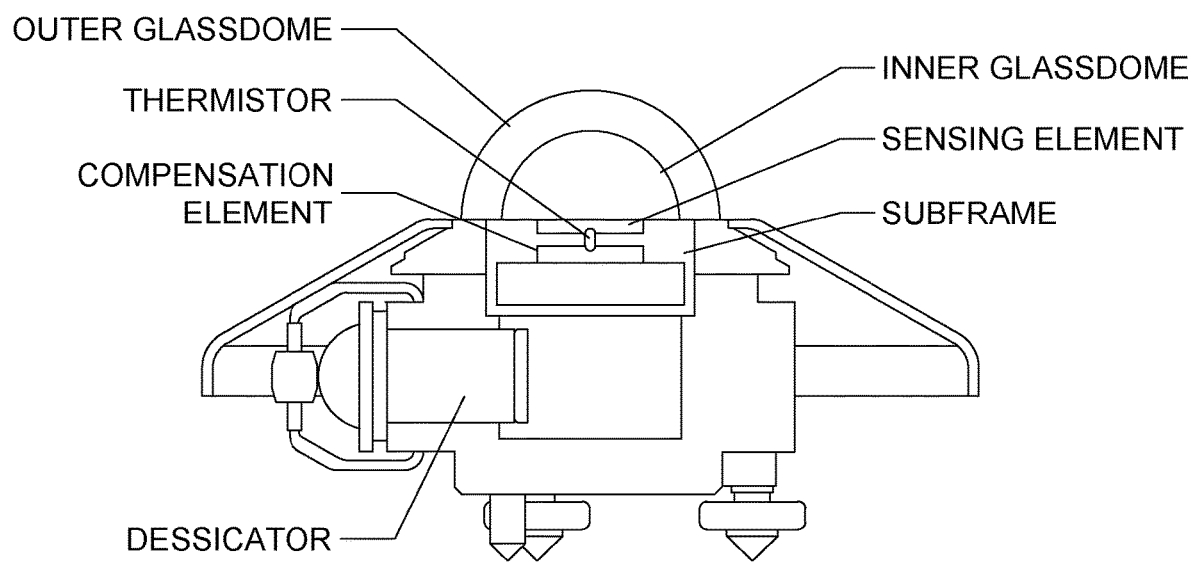
FIG. 4A and FIG. 4B are drawings respectively showing a pyranometer in which a conventional internal drying device is mounted and a pyranometer in which a conventional ventilator is mounted.
Figure 4B:
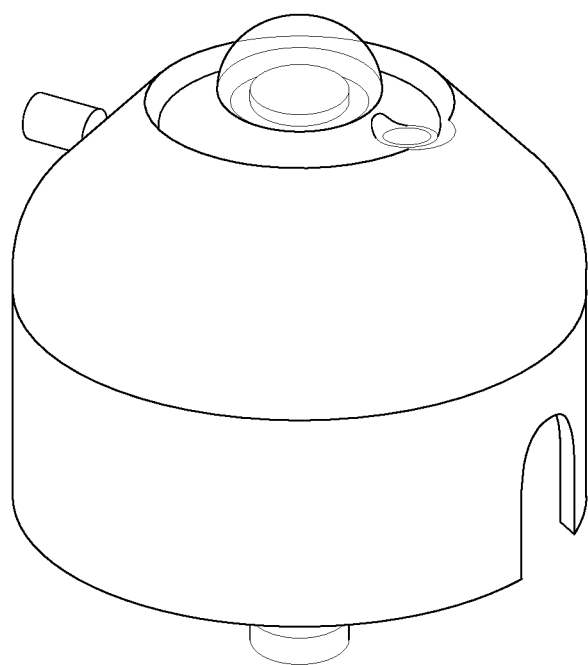

FIG. 3 is a drawing schematically illustrating a configuration of the apparatus 100 for detecting the contamination on the glass dome of the solar radiation observing sensor in accordance with another example embodiment of the present disclosure.

Referring to FIG. 3, it is similar to the configuration in FIG. 1, but the beam splitter 160 is not included, and the light-collecting lens 130 is positioned between a specific point included in the first region where the glass 110 dome is installed and a central region of the support plate A instead of installing the light-collecting lens 130 at the center of the support plate A. The position of the light-collecting lens 130 may be selected as an optimal position to have as little effect as possible on observation of the solar radiation observing sensor 120. That is, the closer the light-collecting lens 130 is to the central region of the support plate A, the less the ratio of a protruding portion of the light-collecting lens 130 diffusely reflecting the natural light toward the solar radiation observing sensor 120, and to the contrary, the further the light-collecting lens 130 is from, the central region of the support plate A, the greater the difference between the diffused light due to the natural light passing through a close spot on the glass dome 110 and the diffused light due to the natural light passing through a distant spot on the glass dome 110, and thus the accurate observation of the contamination-detecting sensor 140 may be difficult. Accordingly, after acquiring various measurement data by changing the position of the light-collecting lens 130, the most appropriate position may be determined.

Herein, in order to minimize the effect of the diffused light, on condition that each of multiple pieces of distribution information of the natural light and the artificial light is stored and managed for each of distances between the light-collecting lens 130 and the specific point and for each of incident angles on the light-collecting lens 130, a position of the contamination on the glass dome 110 is specified by referring to a specific installed position of the light-collecting lens 130 and a specific distribution of the natural light and the artificial light collected by the light-collecting lens 130. That is, each of incident angles of the natural light may be calculated by referring to each of the multiple pieces of the distribution information of the natural light and the artificial light and the installed position of the light-collecting lens 130, and the position of the contaminating substance on the glass dome 110 may be specified through some of the incident angles and the distance between the light-collecting lens 130 and the specific point in the first region where the glass 110 dome is installed.

The present disclosure has an effect of providing the apparatus for detecting the contamination capable of recognizing the position and the degree of the contamination occurred on the glass dome of the solar radiation observing sensor in real time by collecting the diffusely-reflected light due to the contamination.

The present disclosure has another effect of providing the apparatus for detecting the contamination capable of accurately recognizing the position and the degree of the contamination occurred on the glass dome of the solar radiation observing sensor by comparing an amount of sensed light acquired through the glass dome in a contaminated state and an amount of sensed light acquired through the glass dome in a clean state.

The present disclosure has still another effect of providing the apparatus for detecting the contamination capable of accurately recognizing the position and the degree of the contamination regardless of an installed position of the light-collecting lens for detecting the contamination occurred on the glass dome of the solar radiation observing sensor.

The present disclosure has still yet another effect of providing an apparatus for detecting contamination capable of performing calibration by measuring the effect on the measured value of the solar radiation observing sensor that the contamination occurred on the glass dome of the solar radiation observing sensor has.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. An apparatus for detecting a contamination on a glass dome of a solar radiation observing sensor, comprising:
   the solar radiation observing sensor;
   the glass dome, installed in a first region of a support plate, made of a medium having a predetermined thickness surrounding the solar radiation observing sensor;
   a light source, wherein artificial light emitted from the light source is allowed to be incident on the medium of the glass dome at a predetermined angle and thus the artificial light incident on the medium of the glass dome is allowed to undergo total internal reflection within the medium of the glass dome,
   a light-collecting lens configured to collect (i) natural light transmitted from a first outside region of the glass dome to a second outside region of the glass dome and (ii) a part of the artificial light diffusedly reflected to the second outside region by a contaminated region on the surface of the glass dome, wherein an upper outside of the glass dome is referred to as the first outside region and a lower outside of the glass dome is referred to as the second outside region and wherein the light-collecting lens is installed in a second region of the support plate and an outer perimeter of the second region is closer to a center of the support plate than an outer perimeter of the first region; and
   a contamination-detecting sensor configured to detect the contamination, wherein the contamination-detecting sensor measures the natural light and the artificial light collected by the light-collecting lens;
   and the apparatus further comprising:
   a beam splitter configured to deliver a part of the natural light and the artificial light collected by the light-collecting lens to the contamination-detecting sensor and deliver a remaining part of the natural light and the artificial light collected by the light-collecting lens to the solar radiation observing sensor;
   wherein the light-collecting lens is positioned at a top of the beam splitter, and a light path passing through the beam splitter is matched with a predetermined spot of the solar radiation observing sensor.

2. The apparatus of claim 1, further comprising: a processor configured to (i) acquire a first measurement which is a value measured at a first night time when no contamination is present on the surface of the glass dome immediately after the solar radiation observing sensor and the glass dome are installed or cleaned and a second measurement which is a value measured at a second night time which follows the first night time and (ii) determine a degree of contamination and the contaminated region by referring to a comparison result between the first measurement and the second measurement.

3. The apparatus of claim 1, further comprising: a bandpass filter configured to allow light that matches with a main wavelength range of the light source or light whose wavelength range is within a preset threshold from the main wavelength range.

4. The apparatus of claim 1, in case first natural light is introduced from the first outside region to the second outside region through a first spot of the glass dome and in case second natural light is introduced from the first outside region to the second outside region through a second spot of the glass dome, a first focal distance between the first spot and a focal point of the light-collecting lens is determined as being identical to a second focal distance between the second spot and the focal point of the light-collecting lens.

5. The apparatus of claim 1, wherein the light-collecting lens is a fisheye lens.

6. An apparatus for detecting a contamination on a glass dome of a solar radiation observing sensor, comprising:
  the solar radiation observing sensor;
  the glass dome, installed in a first region of a support plate, made of a medium having a predetermined thickness surrounding the solar radiation observing sensor;
  a light source, wherein artificial light emitted from the light source is allowed to be incident on the medium of the glass dome at a predetermined angle and thus the artificial light incident on the medium of the glass dome is allowed to undergo total internal reflection within the medium of the glass dome,
  a light-collecting lens configured to collect (i) natural light transmitted from a first outside region of the glass dome to a second outside region of the glass dome and (ii) a part of the artificial light diffusedly reflected to the second outside region by a contaminated region on the surface of the glass dome, wherein an upper outside of the glass dome is referred to as the first outside region and a lower outside of the glass dome is referred to as the second outside region and wherein the light-collecting lens is installed in a second region of the support plate and an outer perimeter of the second region is closer to a center of the support plate than an outer perimeter of the first region; and
  a contamination-detecting sensor configured to detect the contamination, wherein the contamination-detecting sensor measures the natural light and the artificial light collected by the light-collecting lens;
  wherein the light-collecting lens is positioned between a specific point included in the first region and a central region of the support plate, and
  wherein, on condition that each of multiple pieces of distribution information of the natural light and the artificial light is stored and managed for each of distances between the light-collecting lens and the specific point and for each of incident angles on the light-collecting lens, a position of the contamination on the glass dome is specified by referring to a specific installed position of the light-collecting lens and a specific distribution of the natural light and the artificial light collected by the light-collecting lens.

* * * * *